United States Patent
Atikoglu et al.

(10) Patent No.: US 9,659,273 B2
(45) Date of Patent: May 23, 2017

(54) SYSTEM TO IDENTIFY AND COMMUNICATE IRREGULAR PRODUCT TYPES AND RELATED METHODS

(71) Applicant: Wal-Mart Stores, Inc., Bentonville, AR (US)

(72) Inventors: Berk Atikoglu, San Francisco, CA (US); Eytan Daniyalzade, San Francisco, CA (US)

(73) Assignee: WAL-MART STORES, INC., Bentonville, AR (US)

(*) Notice: Subject to any disclaimer, the term of this patent is extended or adjusted under 35 U.S.C. 154(b) by 0 days.

(21) Appl. No.: 14/642,970

(22) Filed: Mar. 10, 2015

(65) Prior Publication Data
US 2016/0267306 A1    Sep. 15, 2016

(51) Int. Cl.
G06K 5/04 (2006.01)
G06K 7/10 (2006.01)
G06K 9/32 (2006.01)
G06Q 10/08 (2012.01)

(52) U.S. Cl.
CPC .................................. G06Q 10/087 (2013.01)

(58) Field of Classification Search
CPC  G06K 19/00; G06K 9/32; G06K 5/04; G06K 7/10; G06F 17/00; G06F 19/00; G06Q 90/00; G06Q 30/00
USPC ............... 235/462.08, 385, 375, 487, 462.01
See application file for complete search history.

(56) References Cited

U.S. PATENT DOCUMENTS

| | | | |
|---|---|---|---|
| 8,341,028 B2 | 12/2012 | Woolston | |
| 2003/0216969 A1* | 11/2003 | Bauer | G06K 7/0008 705/22 |
| 2009/0231135 A1* | 9/2009 | Chaves | G06Q 10/087 340/572.1 |
| 2011/0087612 A1* | 4/2011 | Yuasa | G06Q 10/08 705/332 |
| 2012/0284132 A1* | 11/2012 | Kim | G07G 1/0081 705/20 |
| 2013/0185150 A1 | 7/2013 | Crum | |
| 2014/0263635 A1* | 9/2014 | Jones | G06Q 10/087 235/385 |
| 2014/0361077 A1* | 12/2014 | Davidson | G06Q 10/08 235/385 |
| 2015/0170256 A1* | 6/2015 | Pettyjohn | G06Q 30/0639 705/14.49 |

* cited by examiner

Primary Examiner — Edwyn Labaze
(74) Attorney, Agent, or Firm — Bryan Cave LLP

(57) ABSTRACT

Some embodiments include a method. The method can include: identifying a first consumer location of a consumer; identifying a first limited irregular product group associated with the first consumer location; and receiving a selected limited irregular product type of one or more first limited irregular product types. The first limited irregular product group can have the first limited irregular product type(s). Further, an irregular product group can have multiple irregular product types, the multiple irregular product types can have the one or more first limited irregular product types, a master product group can have multiple product types, and the multiple product types can have multiple regular product types and the multiple irregular product types. The multiple irregular product types can satisfy at least one irregularity parameter distinguishing the multiple irregular product types from the multiple regular product types. Other embodiments of related methods and systems are also provided.

20 Claims, 6 Drawing Sheets

SYSTEM TO IDENTIFY AND COMMUNICATE IRREGULAR PRODUCT TYPES AND RELATED METHODS

TECHNICAL FIELD

This disclosure relates generally to systems to identify and communicate irregular products types, and relates more particularly to systems to identify and communicate irregular products types associated with a consumer location of a consumer and to related methods.

BACKGROUND

Irregular products of irregular product types may be difficult for consumers to scan and/or purchase. As a result, consumers may be discouraged from scanning and/or purchasing irregular products of irregular product types, resulting in decreased sales for merchants, and/or consumers may form negative opinions of relevant merchants for failing to make irregular products of irregular product types readily available for scan and/or purchase by the consumers, causing the consumers to look for other merchants offering better shopping experiences to the consumers. Accordingly, there is a need for systems and methods to make irregular products of irregular products types more readily available for scan and/or purchase by consumers.

BRIEF DESCRIPTION OF THE DRAWINGS

To facilitate further description of the embodiments, the following drawings are provided in which.

Figure 1:
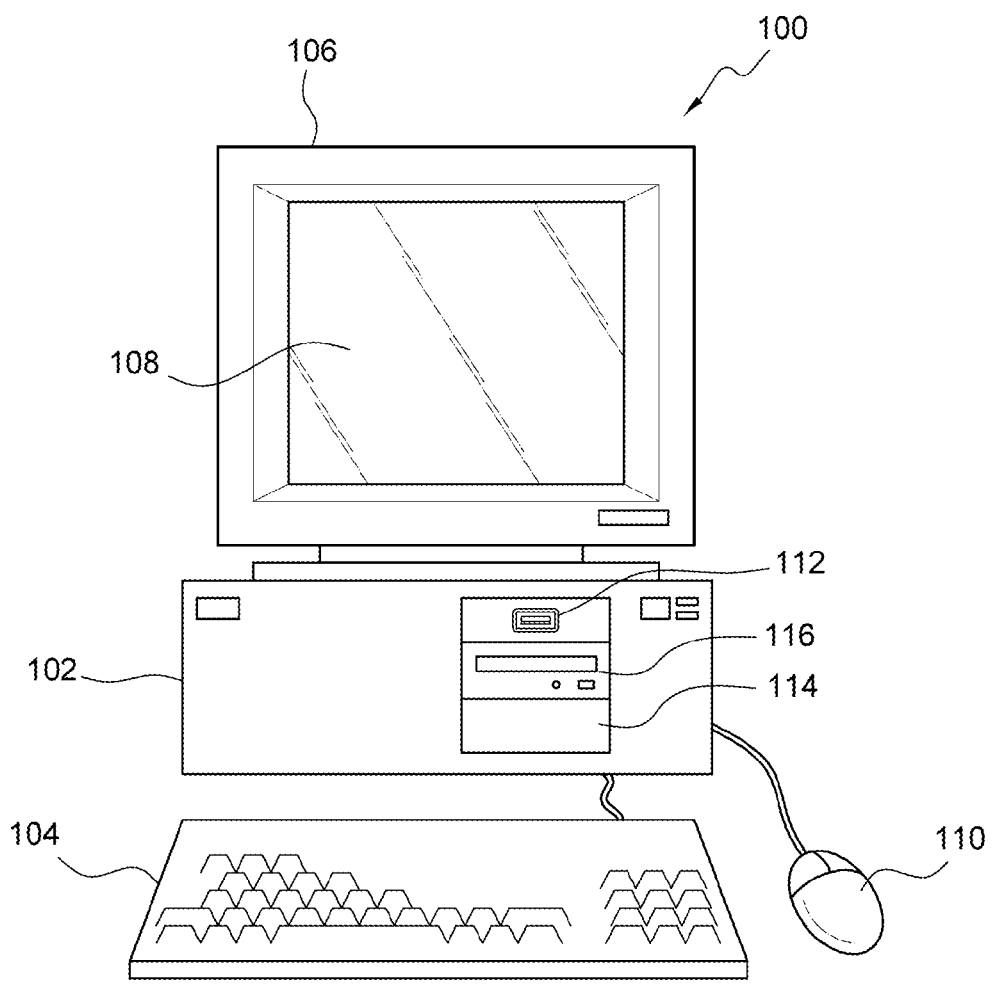
FIG. 1 illustrates a front elevational view of an exemplary computer system that is suitable to implement at least part of a central computer system and/or at least part of one or more consumer computer systems of the system of FIG. 3 and/or to implement at least part of one or more of the activities of FIGS. 6 & 7.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a method. The method can comprise: executing one or more first computer instructions configured to identify a first consumer location of a consumer; executing one or more second computer instructions configured to identify a first limited irregular product group associated with the first consumer location; and executing one or more third computer instructions configured to receive a selected limited irregular product type of one or more first limited irregular product types from a consumer computer device of the consumer. The first limited irregular product group can comprise the one or more first limited irregular product types. Further, an irregular product group can comprise multiple irregular product types, and the multiple irregular product types can comprise the one or more first limited irregular product types. Further still, a master product group can comprise multiple product types, and the multiple product types can comprise multiple regular product types and the multiple irregular product types. The multiple irregular product types can satisfy at least one irregularity parameter distinguishing the multiple irregular product types from the multiple regular product types. Also, the first computer instruction(s) and the second computer instruction(s) can be configured to run at one or more processing modules and configured to be stored at one or more non-transitory memory storage modules.

Other embodiments include a system. The system comprises an input device, a display device, one or more processing modules, and one or more non-transitory memory storage modules. The non-transitory memory storage module(s) are configured to store computer instructions configured to run on the processing module(s) and perform the acts of: identifying a first consumer location of a consumer; identifying a first limited irregular product group associated with the first consumer location; and sending the first limited irregular product group to a consumer computer device of the consumer. The first limited irregular product group can comprise one or more first limited irregular product types. Further, an irregular product group can comprise multiple irregular product types, and the multiple irregular product types can comprise the one or more first limited irregular product types. Further still, a master product group can comprise multiple product types, and the multiple product types can comprise multiple regular product types and the multiple irregular product types. The multiple irregular product types can satisfy at least one irregularity parameter distinguishing the multiple irregular product types from the multiple regular product types. Also, the input device and the display device can be configured to permit an operator of the processing module(s) and the non-transitory memory storage module(s) to manage the processing module(s) and the non-transitory memory storage module(s).

Further embodiments include at least one non-transitory memory storage module having computer instructions stored thereon executable by one or more processing modules to: identify a first consumer location of a consumer; identify a first limited irregular product group associated with the first consumer location; send the first limited irregular product group to a consumer computer device of the consumer; and receive a selected limited irregular product type of one or more first limited irregular product types from the consumer computer device of the consumer. In these embodiments, the multiple product types can comprise product types of a particular store, and the at least one irregularity parameter comprises (i) a barcode placement, (ii) a product weight, (iii) a product size, (iv) a product location within the particular store, and/or (v) a product location within the particular store relative to the first consumer location. The first limited irregular product group can comprise the one or more first limited irregular product types. Further, an irregular product group can comprise multiple irregular product types, and the multiple irregular product types can comprise the one or more first limited irregular product types. Further still, a master product group can comprise multiple product types, and the multiple product types can comprise multiple regular product types and the multiple irregular product types. The multiple irregular product types can satisfy at least one irregularity parameter distinguishing the multiple irregular product types from the multiple regular product types.

Figure 2:
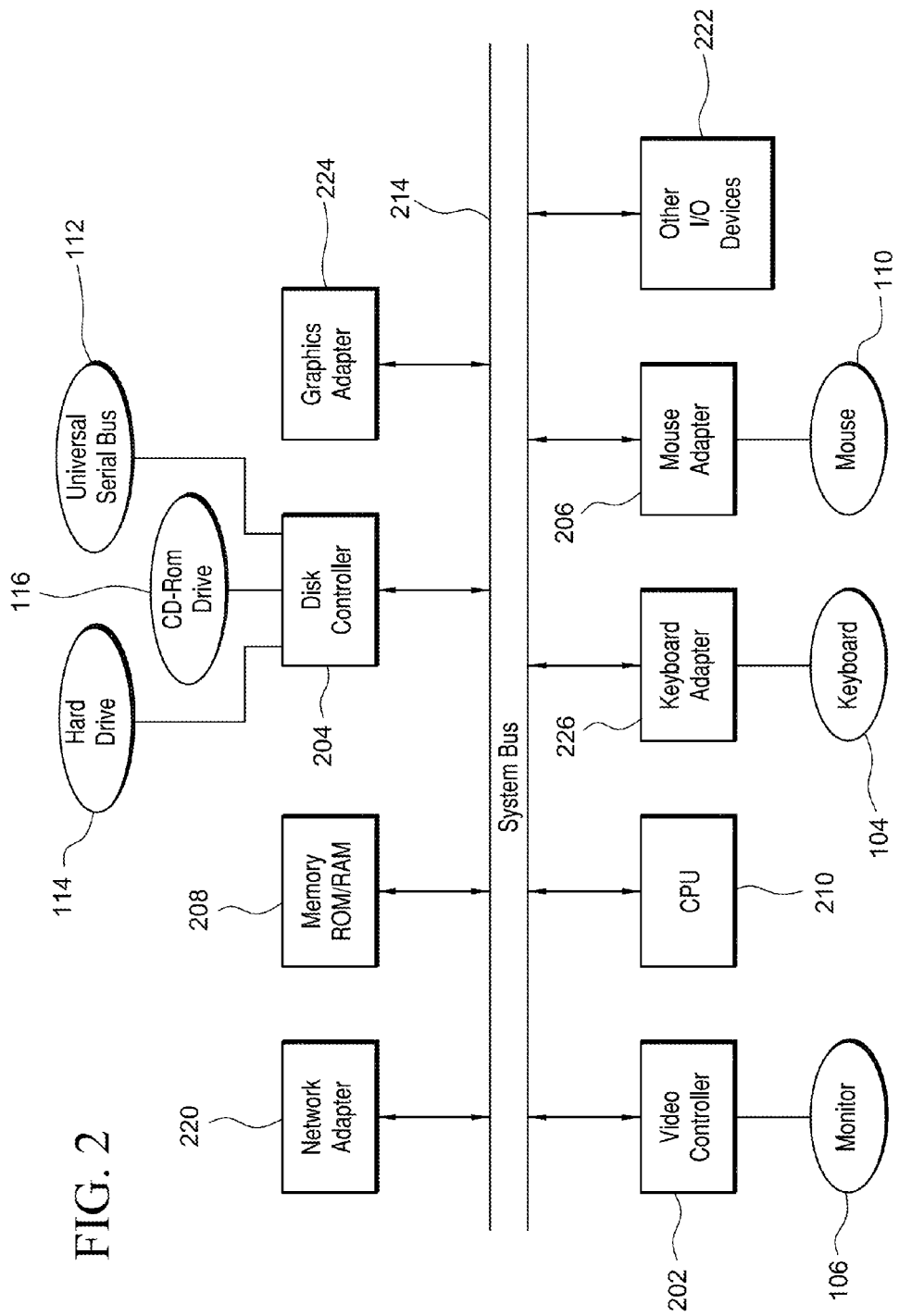
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
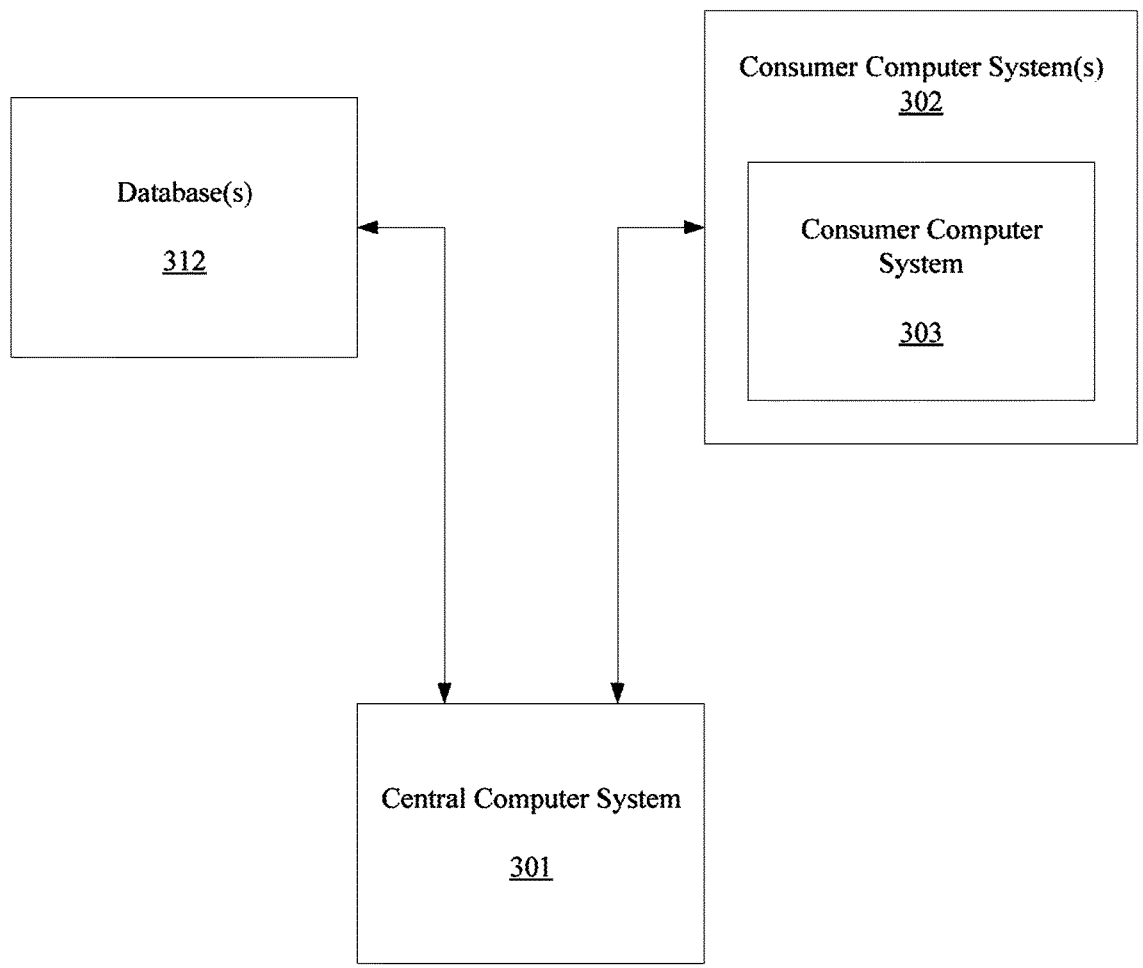
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As described in greater detail below, system 300 can be operable to identify irregular products types associated with a consumer location of a consumer and to communicate those irregular product types to the consumer to make irregular products of the irregular product types more readily available for selection and/or purchase by the consumer. As also described in greater detail below, in many embodiments, system 300 can be further operable to permit the consumer to engage in electronically implemented brick-and-mortar (i.e., scan and go) commerce. In these embodiments, by making irregular products of the irregular product types more readily available for selection and/or purchase by the consumer, system 300 can facilitate scan and go commerce.

In many embodiments, system 300 can communicate the irregular product types to the consumer substantially in real-time (e.g., near real-time), such as, for example, as the consumer location of the consumer changes. As used herein, an event and/or an action being referenced as occurring in real-time can refer to an event and/or an action occurring approximately immediately following a triggering event and/or action. Meanwhile, near real-time can mean real-time less a time delay for implementing (e.g., processing and/or transmitting) the relevant real-time event or action. The particular time delay can vary depending on the type and/or amount of data processed, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to refreshing monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more wearable user computer devices and/or one or more mobile electronic devices, etc. At least part of central computer system 301 can be located remotely from consumer computer system(s) 302.

In many embodiments, a mobile electronic device can refer to a portable electronic device (e.g., an electronic device easily conveyable by hand by a person of average size) with the capability to present audio and/or visual data (e.g., images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ or a similar product by Google Inc. of Menlo Park, Calif., United States of America; (ii) the Eye Tap™, the Laser Eye Tap™, or a similar product by ePI Lab of Toronto, Ontario, Canada, and/or (iii) the Raptyr™, the STAR 1200™, the Vuzix Smart Glasses M100™, or a similar product by Vuzix Corporation of Rochester, N.Y., United States of America. In other specific examples, a head mountable wearable user computer device can comprise the Virtual Retinal Display™, or similar product by the University of Washington of Seattle, Wash., United States of America. Meanwhile, in further specific examples, a limb mountable wearable user computer device can comprise the iWatch™, or similar product by Apple Inc. of Cupertino, Calif., United States of America, and/or the Zip™, One™, Flex™, Charge™, Surge™, or similar product by Fitbit Inc. of San Francisco, Calif., United States of America.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America. Using the software of the consumer computer system(s) 302, the consumer(s) operating consumer computer system(s) 302 can leverage the functionality of system 300 discussed herein, such as, for example, to receive irregular product types at the consumer computer system(s) 302 to make the irregular product types more readily available for purchase by the consumer and/or to engage in scan and go commerce via consumer computer system(s) 302.

Meanwhile, in many embodiments, central computer system 301 also can be configured to communicate with one or more databases 312 (e.g., one or more inventory databases 513 (FIG. 5), one or more weighting factor databases 514 (FIG. 5), etc.). Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3, IEEE 802.11, etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.

For convenience, the functionality of system 300 is described herein as it relates particularly to consumer computer system 303 and a single consumer, but in many embodiments, the functionality of system 300 can be extended to each of consumer computer system(s) 302 and/or to multiple consumers.

Figure 4:
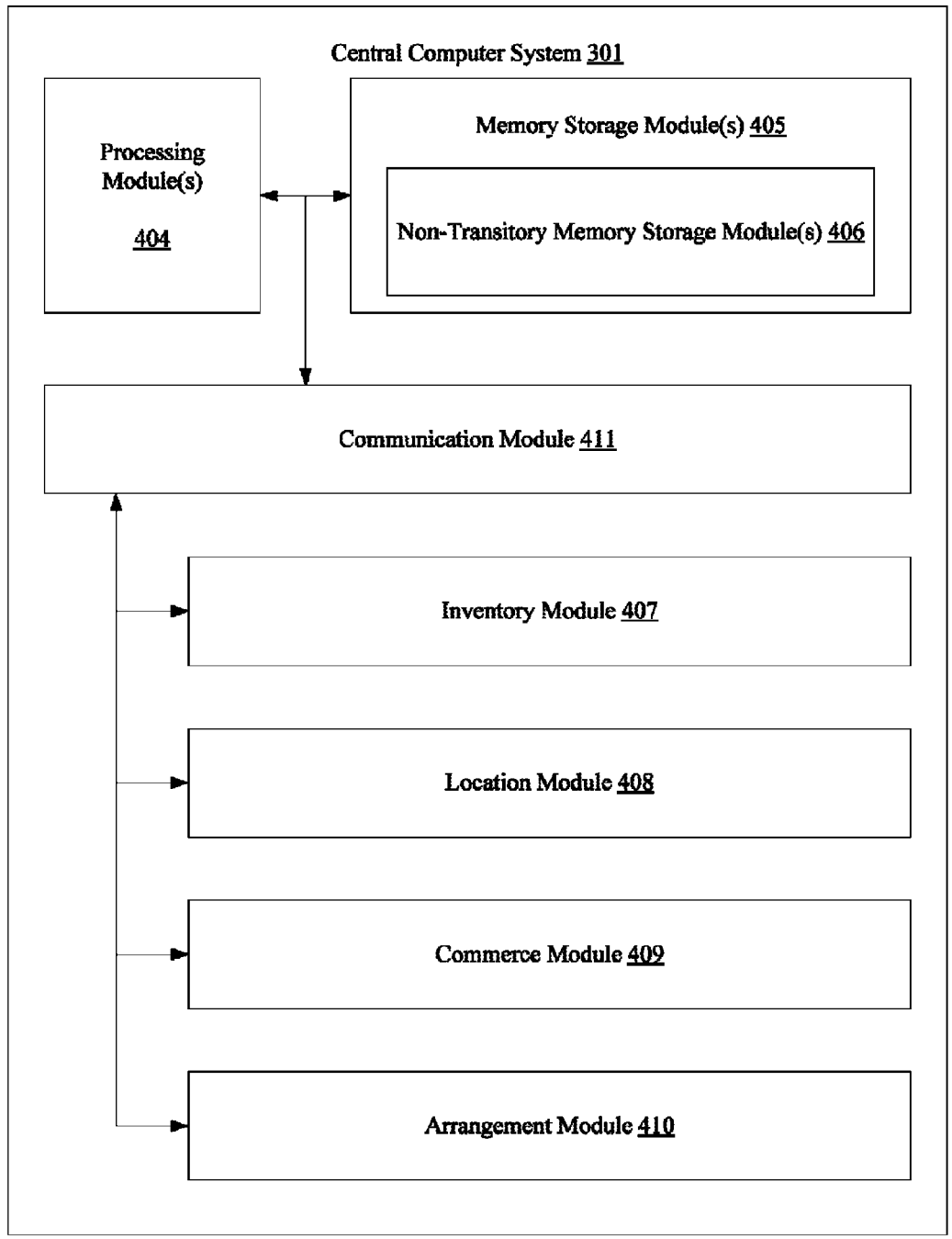
FIG. 4 illustrates a representative block diagram of a central computer system of the system of FIG. 3, according to the embodiment of FIG. 3.
Figure 5:
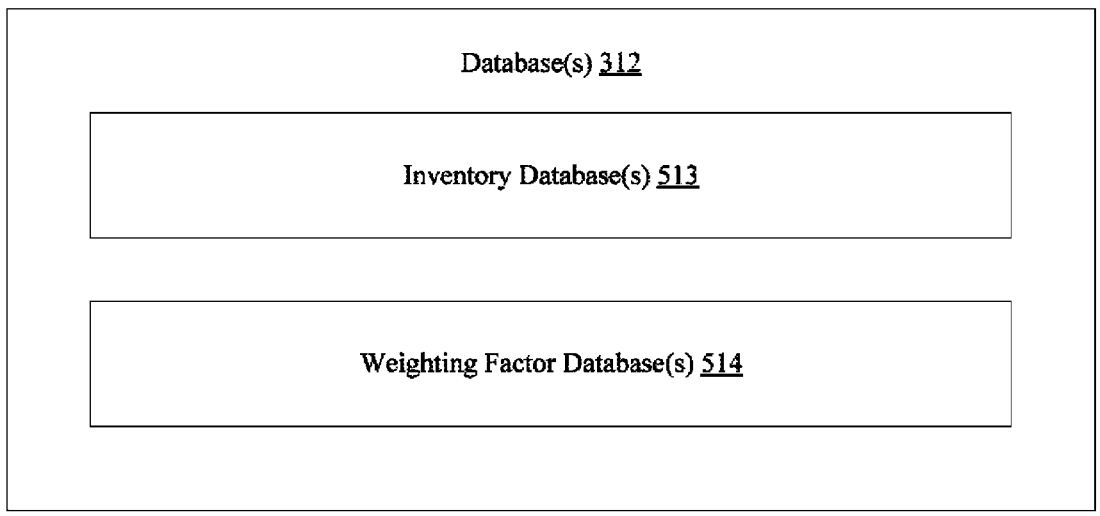
FIG. 5 illustrates a representative block diagram of one or more databases of the system of FIG. 3, according to the embodiment of FIG. 3.

Turning ahead now in the drawings, FIG. 4 illustrates a representative block diagram of central computer system 301, according to the embodiment of FIG. 3; and FIG. 5 illustrates a representative block diagram of database(s) 312, according to the embodiment of FIG. 3.

Referring first to FIG. 4, in many embodiments, central computer system 301 can comprise one or more processing modules 404, one or more memory storage modules 405, an inventory module 407, a location module 408, a commerce module 409, an arrangement module 410, and a communication module 411. Further, memory storage module(s) 405 can comprise non-transitory memory storage module(s) 406. In some embodiments, part or all of at least one or more of inventory module 407, location module 408, commerce module 409, arrangement module 410, and communication module 411 can be part of at least one or more others of inventory module 407, location module 408, commerce module 409, arrangement module 410, and communication module 411, and vice versa. In some embodiments, commerce module 409 and/or arrangement module 410 can be omitted.

Meanwhile, referring briefly to FIG. 5, database(s) 312 can comprise inventory database(s) 513 and weighting factor database(s) 514. In some embodiments, part or all of at least one or more of inventory database(s) 513 or weighting factor database(s) 514 can be part of the other of inventory database(s) 513 and weighting factor database(s) 514, and vice versa. In some embodiments, weighting factor database(s) 514 can be omitted.

Returning now to FIG. 4, in many embodiments, processing module(s) 404 can be similar or identical to the processing module(s) described above with respect to computer system 100 (FIG. 1) and/or central computer system 301 (FIG. 3); memory storage module(s) 405 can be similar or identical to the memory storage module(s) described above with respect to computer system 100 (FIG. 1) and/or central computer system 301 (FIG. 3); and/or non-transitory memory storage module(s) 406 can be similar or identical to the non-transitory memory storage module(s) described above with respect to computer system 100 (FIG. 1) and/or central computer system 301 (FIG. 3). Further, inventory module 407, location module 408, commerce module 409, arrangement module 410, and communication module 411 can be implemented with hardware and/or software, as desirable. Although inventory module 407, location module 408, commerce module 409, arrangement module 410, and communication module 411 are shown at FIG. 4 as being separate from processing module(s) 404, memory storage module(s) 405, and/or non-transitory memory storage module(s) 406, in many embodiments, part or all of inventory module 407, location module 408, commerce module 409, arrangement module 410, and communication module 411 can be stored at memory storage module(s) 405 and/or non-transitory memory storage module(s) 406 and can be called and run at operating module(s) 404, such as, for example, when the part or all of inventory module 407, location module 408, commerce module 409, arrangement module 410, and communication module 411 are implemented as software.

Communication Module 411

Communications module 411 is operable to provide and manage communication between the various elements of central computer system 301 (e.g., processing module(s) 404, memory storage module(s) 405, non-transitory memory storage module(s) 406, inventory module 407, location module 408, commerce module 409, arrangement module 410, etc.) and manage incoming and outgoing communications between central computer system 301 (FIG. 3) and consumer computer system(s) 302 of FIG. 3 (e.g., consumer computer system 303 (FIG. 3)) and/or database(s) 312 (FIG. 3). Like the communications between central computer system 301 (FIG. 3), consumer computer system(s) 302 (FIG. 3), and/or database(s) 312 (FIG. 3), communication module 411 can be implemented using any suitable manner of wired and/or wireless communication, and/or using any one or any combination of wired and/or wireless communication network topologies and/or protocols, as described above with respect to the central computer system 301 (FIG. 3), consumer computer system(s) 302 (FIG. 3), and/or database(s) 312 (FIG. 3). In many embodiments, communication module 411 can be part of hardware and/or software implemented for communications between central computer system 301 (FIG. 3), consumer computer system(s) 302 (FIG. 3), and/or database(s) 312 (FIG. 3). For example, as applicable, communication module 411 can permit processing module(s) 404 to call (i) software (e.g., at least part of inventory module 407, location module 408, commerce module 409, arrangement module 410, etc.) stored at memory storage module(s) 405 and/or non-transitory memory storage module(s) 406, and/or (ii) data stored at memory storage module(s) 405, at non-transitory memory storage module(s) 406, and/or in database(s) 312 (FIG. 3).

Inventory Module 407

Inventory module 407 is operable to identify (e.g., determine) one or more limited irregular product groups associated with one or more consumer locations of the consumer. Inventory module 407 is further operable to communicate (e.g., send) the limited irregular product group(s) to consumer computer system 303 (FIG. 3) to make one or more irregular products of the one or more irregular product types of the irregular product group(s) more readily available for selection and/or purchase by the consumer. Consumer computer system 303 (FIG. 3) can make available (e.g., display) the limited irregular product group(s) at one or more display devices (e.g., one or more monitors, one or more touch screen displays, etc.) of consumer computer system 303 so that the consumer can select and/or purchase one or more products of the irregular product types of the irregular product group(s).

In implementation, inventory module 407 can communicate the limited irregular product group(s) to consumer computer system 303 (FIG. 3) via communication module 411, as described above. Meanwhile, the consumer location of the consumer can be identified by location module 408, as described below; and/or the consumer can select and/or purchase irregular product(s) of the irregular product(s) types of the irregular product group(s) via commerce module 409, as described below.

Inventory module 407 identifies the limited irregular product group(s) from an irregular product group of a master product group. The master product group can comprise product types of (e.g., carried and/or made available for selection and/or sale by) one or more brick-and-mortar stores. In many embodiments, the master product group comprises product types of (e.g., carried and/or made available for selection and/or sale by) one particular brick-and-mortar store.

For clarity, as used herein, the term product type refers to a model, class, genre, etc. of an item (e.g., carried and/or made available for selection and/or sale) in the abstract, whereas the term product refers to a actual concrete item of (e.g., carried and/or made available for selection and/or sale) a particular product type. In other words, a consumer would purchase one or more products of a product type, not the product type itself. Accordingly, to the extent a consumer is referenced herein as purchasing a product type, such language should be understood to mean purchasing one or more products of the product type.

In general, the master product group can comprise a regular product group and the irregular product group. Further, the product types of the master product group can comprise regular product types and irregular product types, and the product types of the irregular product types can comprise limited irregular product types. Meanwhile, the regular product group can comprise the regular product types, and the irregular product group can comprise the irregular product types. Used interchangeably herein, regular product types can refer to product types of the regular product group, and vice versa; irregular product types can refer to product types of the irregular product group; and limited irregular product types can refer to product types of the limited irregular product group(s), and vice versa.

Irregular product types are distinguishable from regular product types in that irregular product types satisfy at least one irregularity parameter. An irregularity parameter can refer to any aspect of a product type that can increase a difficulty of selecting (e.g., scanning) product(s) of the product type using consumer computer system 303 (FIG. 3), the details of which will be better understood with the context of the discussion below of commerce module 409 and scan and go commerce. Exemplary irregularity parameters can comprise barcode placement, product weight, product size, a product location within a particular store, a product location within a particular store relative to a consumer location of the consumer, etc.

In these or other embodiments, barcode placement can refer to the physical location of a scanning indicia (e.g., a barcode) on the product(s) of a product type. For example, the scanning indicia may be covered (e.g., underneath) and/or facing away from the consumer, thereby increasing a difficulty of selecting (e.g., scanning) the product(s).

Further, in these or other embodiments, product weight can refer to a physical weight of the product(s) of a product type, and/or product size can refer to a physical volume and/or shape of the product(s) of the product type. For example, a weight over a predetermined amount may cause the product(s) to be difficult to move (e.g., lift) to gain access to a scanning indicia (e.g., a barcode) on the product(s). Meanwhile, a volume over a predetermined amount and/or an unwieldy shape of the product(s) of the product type may cause the product(s) to be difficult to move (e.g., lift) to gain access to a scanning indicia (e.g., a barcode) on the product(s).

Further still, in these or other embodiments, a product location with a particular store can refer to a physical location (e.g., geographic location) of the product(s) of the product type within the particular store. For example, distance of the product(s) of the product type from points of egress and/or ingress or from one or more other points of reference within the particular store, and/or any other factors affecting accessibility of the product(s) (e.g., different floors, presence of walls or other obstacles, etc.) may increase a difficulty of selecting (e.g., scanning) the product(s). Meanwhile, a product location within a particular store relative to a consumer location of the consumer can refer to a physical location (e.g., geographic location) of the product(s) of the product type within the particular store relative to a physical location (e.g., geographic location) of the consumer. Accordingly, distance of the product(s) of the product type relative to the consumer location and any other factors affecting accessibility of the product(s relative to the consumer location (e.g., different floors, presence of walls or other obstacles, etc.) may increase a difficulty of selecting (e.g., scanning) the product(s). Distances of the product(s) of the product type(s) can be measured according to a shortest physical (e.g., point-to-point) distance or a shortest walking distance. Walking distance can refer to an actual walkable path between the product(s) of the product type(s) and a point of reference or a consumer location, as applicable.

Providing (e.g., at consumer computer system 303 (FIG. 3)) a grouping of irregular product types in an irregular product group separate from regular product types can make selecting and/or purchasing the irregular product type(s) easier for a consumer. However, in many examples, the quantity of the irregular product types of the entire irregular product group may be too voluminous for the consumer to readily navigate, thereby limiting a value of grouping irregular product types separately from regular product types. Therefore, in many embodiments, inventory module 407 can identify (e.g., determine) and communicate to consumer computer system 303 (FIG. 3) the limited irregular product group(s), which can comprise sub-sets of the entire irregular product group, to provide more relevant, and more easily navigable grouping(s) of irregular product type(s) for selection and/or purchase of irregular products of the irregular product type(s) by the consumer. In many embodiments, inventory module 407 can identify (e.g., determine) the limited irregular product group(s) based on the consumer location of the consumer.

In many embodiments, inventory module 407 can receive (e.g., upon request) the master product group, the regular product group, and/or the irregular product group from inventory database(s) 513 (FIG. 5), such as, for example, via communication module 411. Each of the product type(s) of the master product group, the regular product group, and/or the irregular product group can be indexed at inventory database(s) 513 (FIG. 5) with a physical (e.g., geographical) location of the product type(s). Meanwhile, inventory module 407 can receive the consumer location of the consumer from location module 408, such as, for example, via communication module 411. Further, inventory module 407 can identify a predetermined number of the irregular product types of the irregular product group that are nearest to, farthest from, or that satisfy any other desirable relationship with the consumer location of the consumer to form a particular limited irregular product group. The predetermined number of the irregular product types can comprise any suitable number, but in many embodiments, can be greater than or equal to 5 product types and less than or equal to 30 product types. For example, the predetermined number can comprise 5, 10, 15, 20, or 30 product types. In some embodiments, the predetermined number of the irregular product types and/or the relationship with the consumer location of the consumer can be established by the operator of central computer system 301 (FIG. 3). In other embodiments, the predetermined number of the irregular product types and/or the relationship with the consumer location of the consumer can be established by the consumer.

In many embodiments, inventory module 407 can identify (e.g., determine and update) and/or communicate the limited irregular product group(s) to the consumer in real-time (e.g., near real-time), such as, for example, as the consumer location of the consumer changes. In these or other embodiments, inventory module 407 can identify (e.g., determine and update) and/or communicate the limited irregular product group(s) to the consumer upon receiving a request for an updated limited irregular product group from consumer computer system 303 (FIG. 3). In other embodiments, inventory module 407 can identify (e.g., determine and update) and/or communicate the limited irregular product group(s) to the consumer at any suitable predetermined interval of time. In some embodiments, when applicable, the predetermined interval of time can be established by the operator of central computer system 301 (FIG. 3). In other embodiments, when applicable, the predetermined interval of time can be established by the consumer.

In some embodiments, inventory module 407 can identify (e.g., determine) the master product group, the regular product group, and/or the irregular product group that inventor module 407 receives (e.g., requests) from the inventory database(s) 513 (FIG. 5) based on the consumer location of the consumer provided to inventory module 407 by location module 408. For example, inventory module 407 can determine that the consumer location of the consumer coincides with a physical location of one or more brick-and-mortar stores corresponding with a particular master product group, regular product group, and/or irregular product group in order to identify (e.g., determine) the master product group, the regular product group, and/or the irregular product group to receive (e.g., request) from the inventory database(s) 513 (FIG. 5). In other embodiments, inventory module 407 can identify (e.g., determine) the master product group, the regular product group, and/or the irregular product group to receive (e.g., request) from the inventory database(s) 513 (FIG. 5) by receiving a selection of a particular master product group, regular product group, and/or irregular product group from consumer computer system 303 (FIG. 3). Still, in many embodiments, system 300 can be implemented with a single master product group, regular product group, and irregular product group, in which case the master product group, the regular product group, and the irregular product group to receive (e.g., request) from the inventory database(s) 513 (FIG. 5) can simply be known.

Notably, when the functionality of system 300 is extended to each of consumer computer system(s) 302 (FIG. 3) and/or to multiple consumers, inventory module 407 can identify (e.g., determine) different limited irregular product groups for each of consumer computer system(s) 302 (FIG. 3) and/or to multiple consumers based on the different consumer locations of the multiple consumers, and when applicable, different preferences of the multiple consumers regarding the manner in which the limited irregular product groups and their limited irregular product types are communicated.

Location Module 408

Location module 408 is operable to identify (e.g., determine) a consumer location of the consumer. The consumer location can refer to a physical location (e.g., a geographic location) of the consumer. In many embodiments, the consumer location can be represented using any suitable coordinate system (e.g., a latitude, longitude, and elevation coordinate system).

In many embodiments, central computer system 301 (FIG. 3) and/or location module 408 can receive the consumer location from consumer computer system 303 (FIG. 3) via communication module 411 to identify the consumer location. In some embodiments, the consumer can electronically input her location at consumer computer system 303 (FIG. 3), by one or more input devices (e.g., a keyboard, a mouse, a touch screen electronic display, a microphone, etc.) of consumer computer system 303 (FIG. 3), and consumer computer system 303 (FIG. 3) can provide the consumer location to central computer system 301 (FIG. 3) and/or location module 408. In other embodiments, consumer computer system 303 (FIG. 3) can detect the consumer location, such as, for example, using at least one navigation system (e.g., a global positioning system, an indoor positioning system, etc.), and provide the detected consumer location to central computer system 301 (FIG. 3) and/or location module 408. When applicable, location module 408 and/or consumer computer system 303 (FIG. 3) can comprise software and/or hardware suitable for detecting the consumer location using the navigation system(s). Exemplary indoor positioning systems suitable for detecting a consumer location of the consumer can comprise a Bluetooth low energy indoor positioning system, such as, for example, the iBeacon indoor positioning system by Apple Inc. of Cupertino, Calif., United States of America.

Notably, some approaches for identifying the consumer location can be more accurate than others. For example, consumer location detection by consumer computer device 303 (FIG. 3) can be implemented where high accuracy is desirable because it may be more accurate than manual electronic input. Also, in some embodiments, location module 408 can implement multiple approaches to identify (e.g., determine) the consumer location. For example, location module 408 can attempt to use differing location identification approaches according to accuracy in descending order from most accurate to least accurate until the most accurate approach available successfully identifies the consumer location. In particular, detecting the consumer location using an indoor positioning system can be more accurate than using a global positioning system, either of which can be more accurate than a manually electronically input consumer location.

In many embodiments, location module 408 can identify (e.g., determine and update) the consumer location of the consumer in real-time (e.g., near real-time), such as, for example, as the consumer location of the consumer changes. In these or other embodiments, location module 408 can identify (e.g., determine and update) the consumer location of the consumer upon receiving a request for an updated limited irregular product group from consumer computer system 303 (FIG. 3). In other embodiments, inventory module 407 can identify (e.g., determine and update) the consumer location of the consumer upon any suitable predetermined interval of time. In some embodiments, when applicable, the predetermined interval of time can be established by the operator of central computer system 301 (FIG. 3). In other embodiments, when applicable, the predetermined interval of time can be established by the consumer. In many embodiments, the predetermined interval can be the same predetermined interval for which inventory module 407 identifies (e.g., determines and updates) the limited irregular product group(s).

Arrangement Module 410

Arrangement module 410 can be operable to arrange (e.g., order) the product type(s) of the limited irregular product group(s) when the limited irregular product group(s) comprises multiple product types. In many embodiments, arrangement module 410 can arrange (e.g., order) the multiple product types of the limited irregular product group(s) based on one or more weighting factor(s) assigned to the multiple product types. For example, arrangement module 410 can identify (e.g., calculate) an arrangement score for each of the multiple product types based on the weighting factor(s) assigned to the multiple product types and arrange (e.g., order) the multiple product types by highest to lowest arrangement score, or vice versa. In some embodiments, when arrangement module 410 considers multiple weighting factors, each of the weighting factors can affect the arrangement score equally, while in other embodiments, at least one weighting factor of the weighting factors can affect the arrangement score more or less than at least one other weighting factor of the weighting factors. In these or other embodiments, arrangement module 410 can identify (e.g., calculate) higher arrangement scores for a product type as the number of weighting factors assigned to that product type increases. In still other embodiments, when arrangement module 410 considers multiple weighting factors, one or more weighting factors of the weighting factors may be treated with priority over one or more other weighting factor of the weighting factors such that only the weighting factor of the highest priority is considered. In some embodiments, when applicable, the weighting factor or weighting factors considered and/or the amount of weight assigned to the weighting factor(s) considered by arrangement module 410 can be established by the operator of central computer system 301 (FIG. 3). In other embodiments, when applicable, the weighting factor or weighting factors and/or the amount of weight assigned to the weighting factor(s) considered by arrangement module 410 can be established by the consumer. In many embodiments, arrangement module 410 can receive (e.g., request) the weighting factor(s) from weighting factor database(s) 514 (FIG. 5) and/or from consumer computer system 303 (FIG. 3).

A weighting factor considered by arrangement module 410 to arrange (e.g., order) the multiple product types of the limited irregular product group(s) can comprise any factor distinguishing one product type from another product type. However, in many embodiments, exemplary weighting factors can comprise an irregularity weight factor and/or a selection popularity weight factor. For example, an irregularity weight factor can be established according to the number and/or types of irregularity parameters a particular product type satisfies. A higher irregularity weight factor can be assigned to product types satisfying more irregularity parameters and/or certain irregularity parameters compared to other irregularity parameters. Meanwhile, a selection popularity weight factor can be established according to a frequency with which consumers generally and/or the particular consumer selects (e.g., scans) and/or purchases a particular irregular product type relative to other irregular product types.

In some embodiments, arrangement module 410 can be omitted. In these embodiments, the product type(s) of the limited irregular product group(s) may simply be arranged randomly.

Commerce Module 409

Commerce module 409 can be operable to administer selection and purchase of the products of the master product group, the regular product group, the irregular product group, and/or the limited irregular product group(s) by consumer computer system 303 (FIG. 3). Further, in many embodiments, commerce module 409 can define, create, query, organize, update, and/or manage the master product group, the regular product group and the irregular product group stored (e.g., indexed) at inventory database(s) 513 (FIG. 5). In these embodiments, commerce module 409 can communicate with inventory database(s) 513 (FIG. 5) via communication module 411.

In many embodiments, commerce module 409 can permit the consumer to select (e.g., scan) products of the master product group, the regular product group, the irregular product group, and/or the limited irregular product group(s). In these embodiments, the consumer can use consumer computer system 303 (FIG. 3) to select (e.g., scan) products of the master product group, the regular product group, the irregular product group, and/or the limited irregular product group(s) to obtain information about the products and/or to add the products to an electronic (e.g., virtual) shopping cart. Products added to the electronic shopping cart can be purchased by the consumer using consumer computer system 303 (FIG. 3) when the consumer is ready to checkout. This functionality of commerce module 409 can be referred to as electronically implemented brick-and-mortar (i.e., scan and go) commerce. Scan and go commerce can advantageously permit the consumer to obtain information beyond that offered on product packaging, to avoid checkout lines, to stream line payment with electronic purchasing, etc.

As introduced above, commerce module 409 can permit the consumer to scan products of the master product group, the regular product group, the irregular product group, and/or the limited irregular product group(s) with consumer computer system 303 in order to select the products. In these embodiments, consumer computer system 303 (FIG. 3) can comprise any suitable software and/or hardware configured to scan (e.g., optically scan) one or more scanning indicia (e.g., barcodes) of the products. For example, consumer computer system 303 (FIG. 3) can comprise a camera and compatible software configured to allow the camera to optically scan one or more scanning indicia (e.g., barcodes) of the products so that consumer computer system 303 (FIG. 3) can communicate the scanning indicia information to commerce module 409 for identification of the products. The barcodes can comprise linear and/or matrix barcodes, as desirable. Notably, this scanning provides the context for the irregularity parameter(s) of inventory module 407 as described above. For example, products of the master group that are difficult to scan with consumer computer system 303 (FIG. 3) as described here can comprise the irregular products of the irregular product group.

Still, in these or other embodiments, the consumer can also select product types of the master product group, the regular product group, the irregular product group, and/or the limited irregular product group(s) by designating representative icons of the products types at an electronic display of consumer computer system 303 (FIG. 3). Further, the consumer can provide a quantity of products of the selected product types that she desires to purchase. For example, graphical selection of the product types can be implemented for selections of irregular product types from the irregular product group and/or limited irregular product group(s) that the consumer is unable and/or does not desire to attempt to scan to make a selection. Regardless of the manner of selection, consumer computer system 303 (FIG. 3) can provide the selections to central computer system 301 (FIG. 3) and/or commerce module 409 via communication module 411 for identification (e.g., recognition) of the selections by central computer system 301 (FIG. 3) and/or commerce module 409. Likewise, consumer computer system 303 (FIG. 3) can provide the quantities of the selected product types and requests to purchase the quantities of the selected product types to central computer system 301 (FIG. 3) and/or commerce module 409 via communication module 411.

Figure 6:
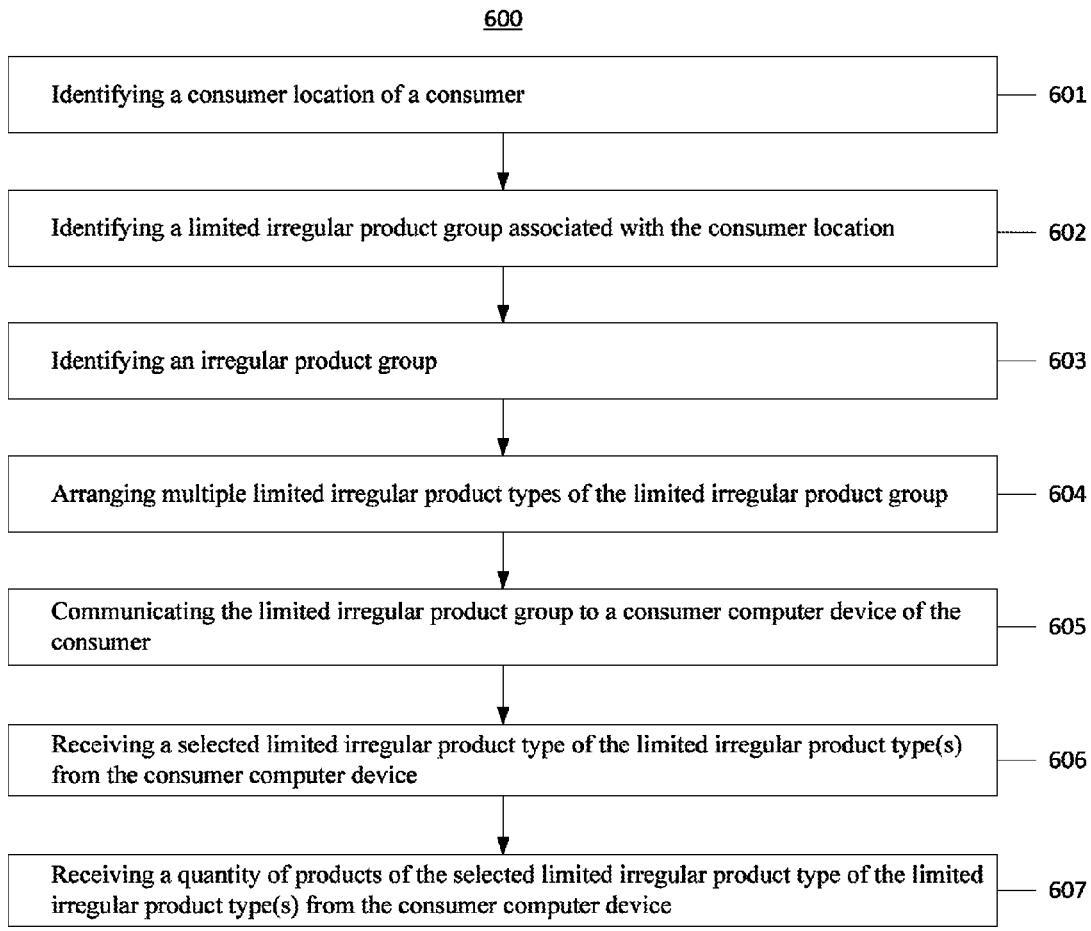
FIG. 6 illustrates a flow chart for a method, according to an embodiment.

Turning ahead in the drawings, FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, central computer system 301 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. The processing module(s) can be similar or identical to the processing module(s) described above with respect to computer system 100 (FIG. 1) and/or to processing module(s) 404 (FIG. 4). Further, the non-transitory memory storage module(s) can be similar or identical to the non-transitory memory storage module(s) described above with respect to computer system 100 (FIG. 1) and/or to non-transitory memory storage module(s) 406 (FIG. 4).

Method 600 can comprise activity 601 of identifying (e.g., determining) a consumer location of a consumer. In some embodiments, performing activity 601 can be similar or identical to identifying (e.g., determining) a consumer location of the consumer as described above with respect to system 300 (FIG. 3) and/or location module 408 (FIG. 4). Further, the consumer location can be similar or identical to the consumer location described above with respect to system 300 (FIG. 3) and/or location module 408 (FIG. 4).

Method 600 can comprise activity 602 of identifying (e.g., determining) a limited irregular product group associated with the consumer location. In some embodiments, performing activity 602 can be similar or identical to identifying (e.g., determining) a limited irregular product group associated with the consumer location as described above with respect to system 300 (FIG. 3) and/or inventory module 407 (FIG. 4). Further, the limited irregular product group can be similar or identical to the limited irregular product group described above with respect to system 300 (FIG. 3) and/or inventory module 407 (FIG. 4). Accordingly, the limited irregular product group can comprise one or more limited irregular product types, and the limited irregular product type(s) can be similar or identical to the limited irregular product type(s) described above with respect to system 300 (FIG. 3) and/or inventory module 407 (FIG. 4). In some embodiments, activity 602 can be performed after and/or approximately simultaneously with activity 601. In further embodiments, activity 602 can be performed responsively to activity 601.

Method 600 can comprise activity 603 of identifying an irregular product group. In some embodiments, performing activity 603 can be similar or identical to identifying an irregular product group as described above with respect to system 300 (FIG. 3) and/or inventory module 407 (FIG. 4). Further, the irregular product group can be similar or identical to the irregular product group described above with respect to system 300 (FIG. 3) and/or inventory module 407 (FIG. 4). Accordingly, the limited irregular product group can comprise a sub-set of the irregular product group. In some embodiments, activity 603 can be performed before and/or approximately simultaneously with activity 602. In further embodiments, activity 603 can be performed as part of activity 602.

Figure 7:
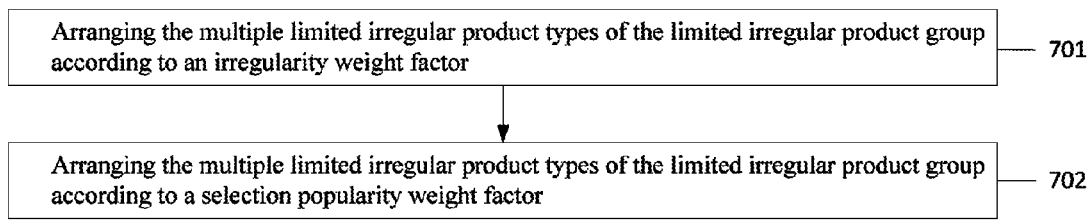
FIG. 7 illustrates an exemplary activity of arranging multiple limited irregular product types of a limited irregular product group, according to the embodiment of FIG. 6.

In some embodiments, when the limited irregular product group comprises multiple limited irregular product types, method 600 can comprise activity 604 of arranging the multiple limited irregular product types of the limited irregular product group, such as, for example, using one or more weighting factors. In these embodiments, performing activity 604 can be similar or identical to arranging the multiple limited irregular product types of the limited irregular product group as described above with respect to system 300 (FIG. 3) and/or arrangement module 410 (FIG. 4). Further, the weighting factor(s) can be similar or identical to the weighting factor(s) described above with respect to system 300 (FIG. 3) and/or arrangement module 410 (FIG. 4). In many embodiments, activity 604 can be performed after activity 601 and activity 602. In other embodiments, activity 604 can be omitted. FIG. 7 illustrates an exemplary activity 604, according to the embodiment of FIG. 6.

For example, activity 604 can comprise activity 701 of arranging the multiple limited irregular product types of the limited irregular product group according to an irregularity weight factor. In some embodiments, the irregular weight factor can be similar or identical to the irregular weight factor described above with respect to system 300 (FIG. 3) and/or arrangement module 410 (FIG. 4).

Further, activity 604 can comprise activity 702 of arranging the multiple limited irregular product types of the limited irregular product group according to a selection popularity weight factor. In some embodiments, the selection popularity weight factor can be similar or identical to the selection popularity weight factor described above with respect to system 300 (FIG. 3) and/or arrangement module 410 (FIG. 4). In many embodiments, activity 701 and activity 702 can be performed approximately simultaneously with each other.

Referring now back to FIG. 6, method 600 can comprise activity 605 of communicating (e.g., sending) the limited irregular product group to a consumer computer device of the consumer. In some embodiments, performing activity 605 can be similar or identical to communicating (e.g., sending) the limited irregular product group to a consumer computer device of the consumer as described above with respect to system 300 (FIG. 3) and/or inventor module 407 (FIG. 4). Further, the consumer computer device can be similar or identical to any one of consumer computer device(s) 302 (FIG. 3) and/or to consumer computer device 303 (FIG. 3); and/or the consumer can be similar or identical to the consumer described above with respect to system 300 (FIG. 3). In many embodiments, activity 605 can be performed after activities 601-603. In some embodiments, when applicable, activity 605 can be performed after activity 604.

Method 600 can comprise activity 606 of receiving a selected limited irregular product type of the limited irregular product type(s) from the consumer computer device. In some embodiments, performing activity 606 can be similar or identical to receiving a selected limited irregular product type of the limited irregular product type(s) from the consumer computer device as described above with respect to system 300 (FIG. 3) and/or commerce module 409 (FIG. 4).

Further, method 600 can comprise activity 607 of receiving a quantity of products of the selected limited irregular product type of the limited irregular product type(s) from the consumer computer device. In some embodiments, performing activity 607 can be similar or identical to receiving a quantity of products of the selected limited irregular product type of the limited irregular product type(s) from the consumer computer device as described above with respect to system 300 (FIG. 3) and/or commerce module 409 (FIG. 4). In some embodiments, activity 607 can be performed after activity 606 and/or approximately simultaneously with activity 606. In other embodiments, activity 606 and/or activity 607 can be omitted.

In many embodiments, activity 601 and activity 602 can be performed again one or more times to identify (e.g., determine) multiple (e.g., different) limited irregular product groups for multiple (e.g., different) consumer locations of the consumer. In these or other embodiments, one or more of activities 603-607 can be performed again as applicable to the particular consumer location and/or limited irregular product group. In many embodiments, one or more of activities 601-607 can be performed (e.g., repeated) in real-time or near-real time, as described above, such as, for example, as the consumer location changes, upon receiving a request from the consumer computer system, upon a passing of a predetermined interval of time, etc., as similarly or identically described above with respect to system 300 (FIG. 3).

Although extending an existing product taxonomy has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the activities of FIGS. 6 and/or 7 may include different activities and be performed by many different modules, in many different orders. As another example, the modules within central computer system 301 in FIG. 3 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
    executing one or more first computer instructions configured to identify a first consumer location of a consumer;
    executing one or more second computer instructions configured to identify a first limited irregular product group associated with the first consumer location; and
    executing one or more third computer instructions configured to receive a selected limited irregular product type of one or more first limited irregular product types from a consumer computer device of the consumer;
    wherein:
        executing the one or more second computer instructions comprises:
            executing one or more fourth computer instructions configured to select, based on identifying the first consumer location, the first limited irregular product group from multiple limited irregular product groups;
        the multiple limited irregular product groups are different from each other and are associated with different consumer locations of the consumer;
        the multiple limited irregular product groups comprise the first limited irregular product group;
        the different consumer locations comprise the first consumer location;
        the first limited irregular product group comprises the one or more first limited irregular product types;
        an irregular product group comprises multiple irregular product types, and the multiple irregular product types comprise the one or more first limited irregular product types;
        a master product group comprises multiple product types, and the multiple product types comprise multiple regular product types and the multiple irregular product types;
        the multiple irregular product types satisfy at least one irregularity parameter distinguishing the multiple irregular product types from the multiple regular product types; and
        the one or more first computer instructions, the one or more second computer instructions, and the one or more third computer instructions are configured to run at one or more processing modules and configured to be stored at one or more non-transitory memory storage modules.

2. The method of claim 1 wherein:
the at least one irregularity parameter comprises a barcode placement.

3. The method of claim 1 wherein:
the at least one irregularity parameter comprises a product weight.

4. The method of claim 1 wherein:
the at least one irregularity parameter comprises a product size.

5. The method of claim 1 wherein:
the multiple product types comprise product types of a particular store; and the at least one irregularity parameter comprises a product location within the particular store.

6. The method of claim 1 wherein:
the multiple product types comprise product types of a particular store; and
the at least one irregularity parameter comprises a product location within the particular store relative to the first consumer location.

7. The method of claim 1 further comprising:
executing one or more fifth computer instructions configured to identify the irregular product group;
wherein:
the one or more fifth computer instructions are configured to run at the one or more processing modules and configured to be stored at the one or more non-transitory memory storage modules.

8. The method of claim 1 wherein:
the one or more first limited irregular product types comprise multiple first limited irregular product types;
the method further comprises executing one or more fifth computer instructions configured to arrange the multiple first limited irregular product types; and
the one or more fifth computer instructions are configured to run at the one or more processing modules and configured to be stored at the one or more non-transitory memory storage modules.

9. The method of claim 8 wherein:
executing the one or more fifth computer instructions comprises executing one or more sixth computer instructions configured to arrange the multiple first limited irregular product types according to an irregularity weight factor of the multiple first limited irregular product types.

10. The method of claim 8 wherein:
executing the one or more fifth computer instructions comprises executing one or more sixth computer instructions configured to arrange the multiple first limited irregular product types according to a selection popularity weight factor of the multiple first limited irregular product types.

11. The method of claim 1 further comprising:
executing one or more fifth computer instructions configured to send the first limited irregular product group to the consumer computer device of the consumer;
wherein:
the one or more fifth computer instructions are configured to run at the one or more processing modules and configured to be stored at the one or more non-transitory memory storage modules.

12. The method of claim 1 further comprising:
executing one or more fifth computer instructions configured to receive a quantity of products of the selected limited irregular product type of the one or more first limited irregular product types from the consumer computer device of the consumer;
wherein:
the one or more fifth computer instructions are configured to run at the one or more processing modules and configured to be stored at the one or more non-transitory memory storage modules.

13. The method of claim 1 wherein:
executing the one or more first computer instructions comprises executing one or more fifth computer instructions configured to receive the first consumer location of the consumer from the consumer computer device of the consumer, the consumer computer device of the consumer having detected the first consumer location using at least one navigation system of the consumer computer device of the consumer.

14. The method of claim 1 further comprising:
after executing the one or more second computer instructions, executing one or more fifth computer instructions configured to identify a second consumer location of the consumer; and
executing one or more sixth computer instructions configured to identify a second limited irregular product group associated with the second consumer location;
wherein:
executing the one or more sixth computer instructions comprises:
executing one or more seventh computer instructions configured to select, based on identifying the second consumer location, the second limited irregular product group from the multiple limited irregular product groups;
the multiple limited irregular product groups comprise the second limited irregular product group;
the different consumer locations comprise the second consumer location;
the second limited irregular product group comprises one or more second limited irregular product types;
the multiple irregular product types comprise the one or more second limited irregular product types; and
the one or more fifth computer instructions and the one or more sixth computer instructions are configured to run at the one or more processing modules and configured to be stored at the one or more non-transitory memory storage modules.

15. The method of claim 14 further comprising:
after executing the one or more sixth computer instructions, executing one or more eighth computer instructions configured to identify that the consumer has returned to the first consumer location; and
executing one or more ninth computer instructions configured to identify again the first limited irregular product group associated with the first consumer location;
wherein:
the one or more eighth computer instructions and the one or more ninth computer instructions are configured to run at the one or more processing modules and configured to be stored at the one or more non-transitory memory storage modules.

16. The method of claim 1 wherein:
executing the one or more first computer instructions and executing the one or more second computer instructions occurs in real-time.

17. A system comprising:
an input device;
a display device;
one or more processing modules; and
one or more non-transitory memory storage modules storing computer instructions configured to run on the one or more processing modules and perform acts comprising:
identifying a first consumer location of a consumer;
identifying a first limited irregular product group associated with the first consumer location; and
sending the first limited irregular product group to a consumer computer device of the consumer;
wherein:
identifying the first limited irregular product group associated with the first consumer location comprises:

selecting, based on identifying the first consumer location, the first limited irregular product group from multiple limited irregular product groups;

the multiple limited irregular product groups are different from each other and are associated with different consumer locations of the consumer;

the multiple limited irregular product groups comprise the first limited irregular product group;

the different consumer locations comprise the first consumer location;

the first limited irregular product group comprises one or more first limited irregular product types;

an irregular product group comprises multiple irregular product types, and the multiple irregular product types comprise the one or more first limited irregular product types;

a master product group comprises multiple product types, and the multiple product types comprise multiple regular product types and the multiple irregular product types;

the multiple irregular product types satisfy at least one irregularity parameter distinguishing the multiple irregular product types from the multiple regular product types; and the input device and the display device are configured to permit an operator of the one or more processing modules and the one or more non-transitory memory storage modules to manage the one or more processing modules and the one or more non-transitory memory storage modules.

18. The system of claim 17 wherein:
the multiple product types comprise product types of a particular store; and
the at least one irregularity parameter comprises (i) a barcode placement, (ii) a product weight, (iii) a product size, (iv) a product location within the particular store, or (v) a product location within the particular store relative to the first consumer location.

19. At least one non-transitory memory storage module having computer instructions stored thereon executable by one or more processing modules to:
identify a first consumer location of a consumer;
identify a first limited irregular product group associated with the first consumer location;
send the first limited irregular product group to a consumer computer device of the consumer; and
receive a selected limited irregular product type of one or more first limited irregular product types from the consumer computer device of the consumer;
wherein:
identifying the first limited irregular product group associated with the first consumer location comprises:
selecting, based on identifying the first consumer location, the first limited irregular product group from multiple limited irregular product groups;

the multiple limited irregular product groups are different from each other and are associated with different consumer locations of the consumer;

the multiple limited irregular product groups comprise the first limited irregular product group;

the different consumer locations comprise the first consumer location;

the first limited irregular product group comprises the one or more first limited irregular product types;

an irregular product group comprises multiple irregular product types, and the multiple irregular product types comprise the one or more first limited irregular product types;

a master product group comprises multiple product types, and the multiple product types comprise multiple regular product types and the multiple irregular product types;

the multiple irregular product types satisfy at least one irregularity parameter distinguishing the multiple irregular product types from the multiple regular product types;

the multiple product types comprise product types of a particular store; and the at least one irregularity parameter comprises at least one of: (i) a barcode placement, (ii) a product weight, (iii) a product size, (iv) a product location within the particular store, or (v) a product location within the particular store relative to the first consumer location.

20. The at least one non-transitory memory storage module of claim 19 wherein the computer instructions stored thereon are further executable by the one or more processing modules to:
after identifying the first consumer location of the consumer, identify a second consumer location of the consumer; and
identify a second limited irregular product group associated with the second consumer location;
wherein:
identifying the second limited irregular product group associated with the second consumer location comprises:
selecting, based on identifying the second consumer location, the second limited irregular product group from the multiple limited irregular product groups;

the multiple limited irregular product groups comprise the second limited irregular product group;

the different consumer locations comprise the second consumer location;

the second limited irregular product group comprises one or more second limited irregular product types; and the multiple irregular product types comprise the one or more second limited irregular product types.

* * * * *